(12) United States Patent
Martin

(10) Patent No.: US 7,444,710 B1
(45) Date of Patent: Nov. 4, 2008

(54) PORTABLE VACUUM SYSTEM FOR USE WITH PORTABLE CHILD SAFETY SEAT

(76) Inventor: Ashly R. Martin, 11327 5B Ranch Rd., Menard, TX (US) 76859

( * ) Notice: Subject to any disclaimer, the term of this patent is extended or adjusted under 35 U.S.C. 154(b) by 0 days.

(21) Appl. No.: 11/861,836

(22) Filed: Sep. 26, 2007

(51) Int. Cl.
*A47L 5/38* (2006.01)
*B60S 1/54* (2006.01)

(52) U.S. Cl. ............... 15/313; 15/323; 15/327.2; 15/328; 15/344; 15/351; 297/250.1; 297/256.16

(58) Field of Classification Search ............... 15/301, 15/313, 327.2, 328, 323, 344, 351; 297/92, 297/93, 118, 182, 250.1, 256.16; *A47L 5/36, A47L 5/38; B60S 1/54, 1/64*
See application file for complete search history.

(56) References Cited

U.S. PATENT DOCUMENTS

| 3,449,787 | A |  | 6/1969 | Rothstein et al. |
| D346,051 | S |  | 4/1994 | Freiwald et al. |
| 5,829,091 | A |  | 11/1998 | Ingram et al. |
| 6,039,776 | A | * | 3/2000 | Liue et al. .................. 55/385.1 |
| 6,128,804 | A |  | 10/2000 | Lee et al. |
| 6,588,821 | B2 | * | 7/2003 | Worrell et al. ............. 296/37.8 |
| 7,152,272 | B2 | * | 12/2006 | Rukavina et al. .............. 15/313 |
| 7,266,859 | B2 | * | 9/2007 | Slone .......................... 15/313 |
| 2004/0107528 | A1 |  | 6/2004 | LeClear et al. |
| 2004/0134013 | A1 |  | 7/2004 | Slone |
| 2006/0080801 | A1 |  | 4/2006 | Narneth |

* cited by examiner

*Primary Examiner*—David A Redding
(74) *Attorney, Agent, or Firm*—Kyle Fletcher

(57) ABSTRACT

The present invention relates to a portable vacuum system that is secured to the underside of a child safety seat. The invention consists of a child safety seat with a vacuuming system neatly fastened to the seat base. The vacuuming system would be powered by either batteries or a cord connection to the cigarette lighter of a vehicle. The vacuuming system would include a retractable hose with a nozzle and various attachments. The lower seat base would also have simple control switches as well as a disposal tray for removing dirt and debris collected during vacuuming. A second embodiment of the present invention would include a child safety seat with the vacuuming system integrated into the base of the child safety seat.

6 Claims, 5 Drawing Sheets

PORTABLE VACUUM SYSTEM FOR USE WITH PORTABLE CHILD SAFETY SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to a portable vacuum system for attachment with a portable child safety seat.

B. Discussion of the Prior Art

The Slone Patent Application Publication (U.S. Pub. No. 2004/00134013) discloses a vacuum cleaner assembly in an vehicle that has a suction nozzle and controls for the vacuum all located within a reach zone of the driver sitting in the drivers seat. However, the vacuum cleaner assembly of the Slone patent is not attached to the underside of a portable child safety seat.

The Ingram et al. patent (U.S. Pat. No. 5,829,091) discloses an automobile central vacuuming system. However, the central vacuuming system of the Ingram patent is permanently installed inside of the vehicle, and is not attached to the underside of a portable child safety seat.

The Lee et al. patent (U.S. Pat. No. 6,128,804) discloses a vacuuming system for a motor vehicle with multiple components including a litter box mounted into the vehicle. However, the system disclosed under the Lee patent, like the system under the Ingram patent, is permanently installed inside of a motor vehicle, and is neither portable nor attachable to the underside of a child safety seat.

The Rothstein patent (U.S. Pat. No. 3,449,787) discloses a central vacuuming system for a vehicle. However, the central vacuuming system is permanently installed in the vehicle and is not attachable to the underside of a portable child safety seat.

The Freiwald patent et al. (U.S. Pat. Des. 346,051) illustrates an ornamental design for a vehicle vacuum cleaner, which does not attach to the underside of a portable child safety seat.

The Nameth Patent Application Publication (U.S. Pub. No. 2006/0080801) discloses a vacuum cleaning system for vehicles with an inlet port mounted in a predetermined portion of the interior cabin. Again, the vacuum system of the Nameth publication is permanently installed in the vehicle, and is not attached to the underside of a portable child safety seat.

The LeClear Patent Application Publication (U.S. Pub. No. 2004/0107528) discloses a vacuuming apparatus built-in to a vehicle that has a vacuum canister with a vacuum motor. However, the vacuuming apparatus of the LeClear publication is designed to fit under a console and is not attachable to the underside of a portable child safety seat.

In light of the above discussed prior art there is a need for a portable vacuum system that attaches to the underside of a portable child safety seat of which the vacuum cleaning system is powered by a rechargeable battery pack or by a electricity supplied by the vehicle in which it is being operated.

BRIEF SUMMARY OF THE INVENTION

The present invention relates to a portable vacuum system that is secured to the underside of a child safety seat. The invention consists of a child safety seat with a vacuuming system neatly fastened to the seat base. The vacuuming system would be powered by either batteries or a cord connection to the cigarette lighter of a vehicle. The vacuuming system would include a retractable hose with a nozzle and various attachments. The lower seat base would also have simple control switches as well as a disposal tray for removing dirt and debris collected during vacuuming. A second embodiment of the present invention would include a child safety seat with the vacuuming system integrated into the base of the child safety seat.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
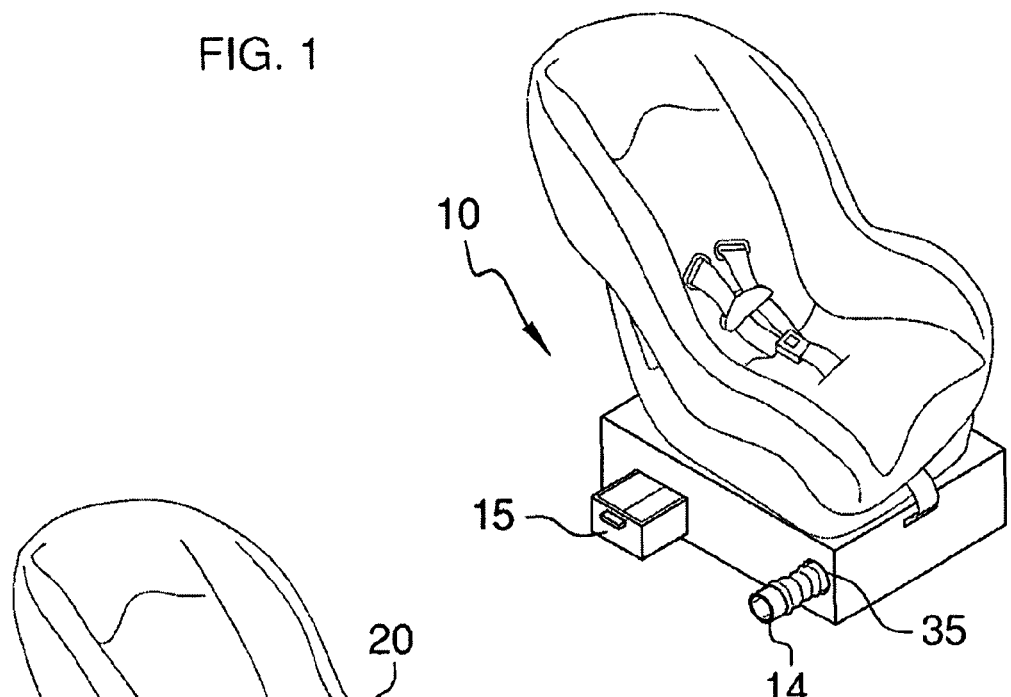
FIG. 1 illustrates an isometric view of invention attached to the safety seat.

Detailed reference will now be made to the present invention, examples of which are illustrated in FIGS. 1-5. A portable vacuum system 10 (hereinafter invention) is designed to be attached to the underside of a portable child safety seat 20. The invention 10 includes a housing 11 containing therein a motor 12, vacuuming fan 13, retractable hosing assembly 14, a collection drawer 15, exhaust vent 16, latches 17.

Figure 4:
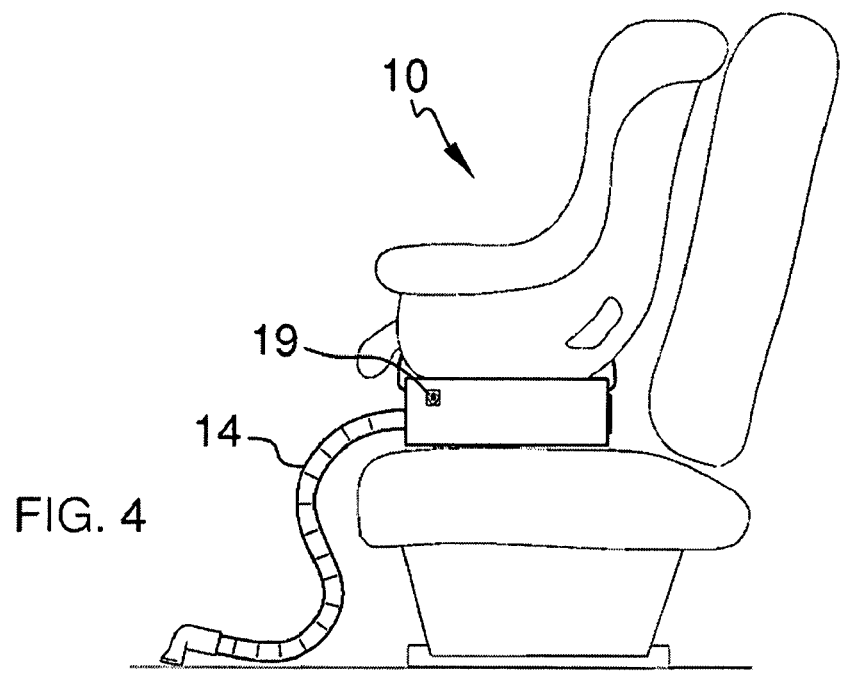
FIG. 4 illustrates a side view of the invention in use.
Figure 5:
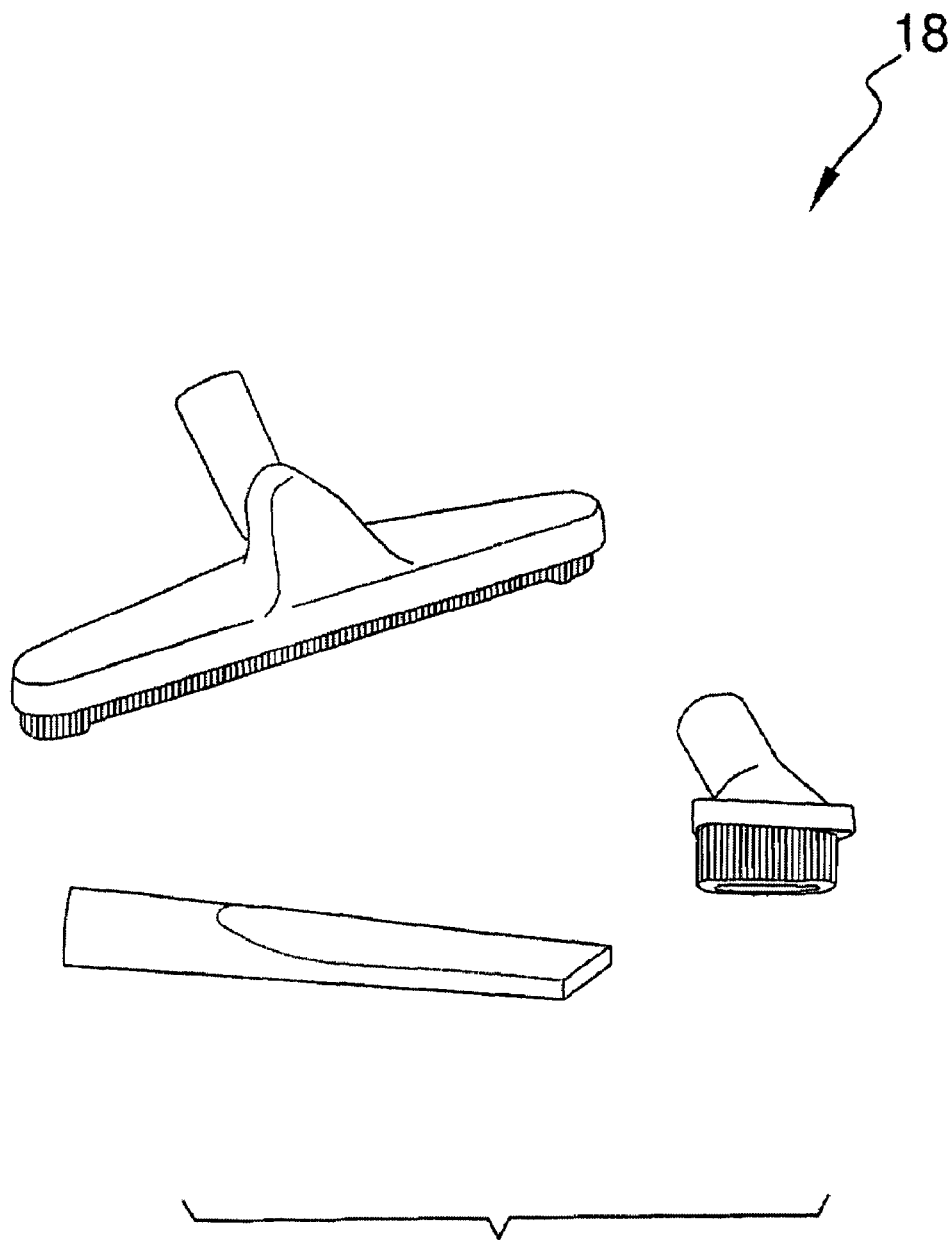
FIG. 5 illustrates an isometric view of the various attachments of the invention.

The latches 17 of the invention are used to secure the housing 11 of the invention 10 to the underside of the portable 11 child safety seat 20. The invention 10 also includes a plurality of accessories 18, which are illustrated in FIGS. 4 and 5. Located on the exterior of the housing 11 is an ON/OFF switch 19, which is electrically wired to the motor 12.

The invention 10 is electrically powered via two distinguishable embodiments. Under the first embodiment of the invention 10, a battery compartment 33 is included within the housing 11, and includes a plurality of rechargeable batteries 34. Under the second embodiment of the present invention 10, electricity is supplied via a DC electrical cord (not shown), which simply plugs into a standard cigarette lighter of a vehicle.

It shall be noted that the retractable hosing assembly 14 is capable of extending and retracting through a hose opening 35 in the housing 11.

Figure 2:
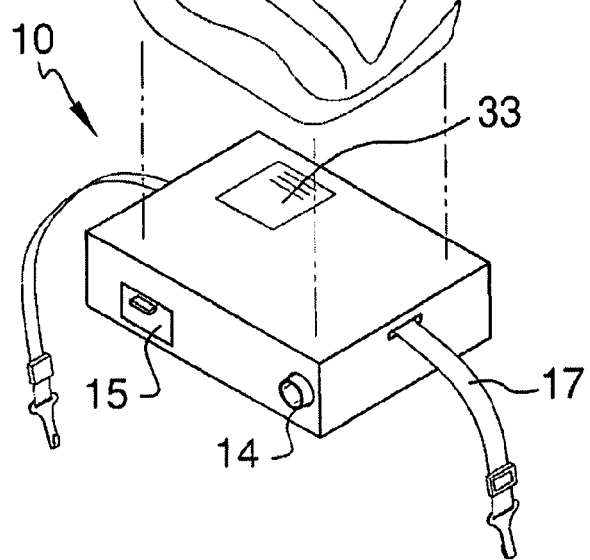
FIG. 2 illustrates an exploded view of the invention detached from the safety seat.

Referring to FIGS. 1 and 2, the collection drawer 15 can extend and retract with respect to the housing 11 in order to remove the accumulated debris collection during the vacuuming process.

It shall be further noted that the child safety seat 20 will be required to be buckled to a car seat 30 after the invention 10 is secured to the underside of the child safety seat 20. To do so otherwise, would not secure the child safety seat 20 in place with respect to the car seat 30.

Figure 6:
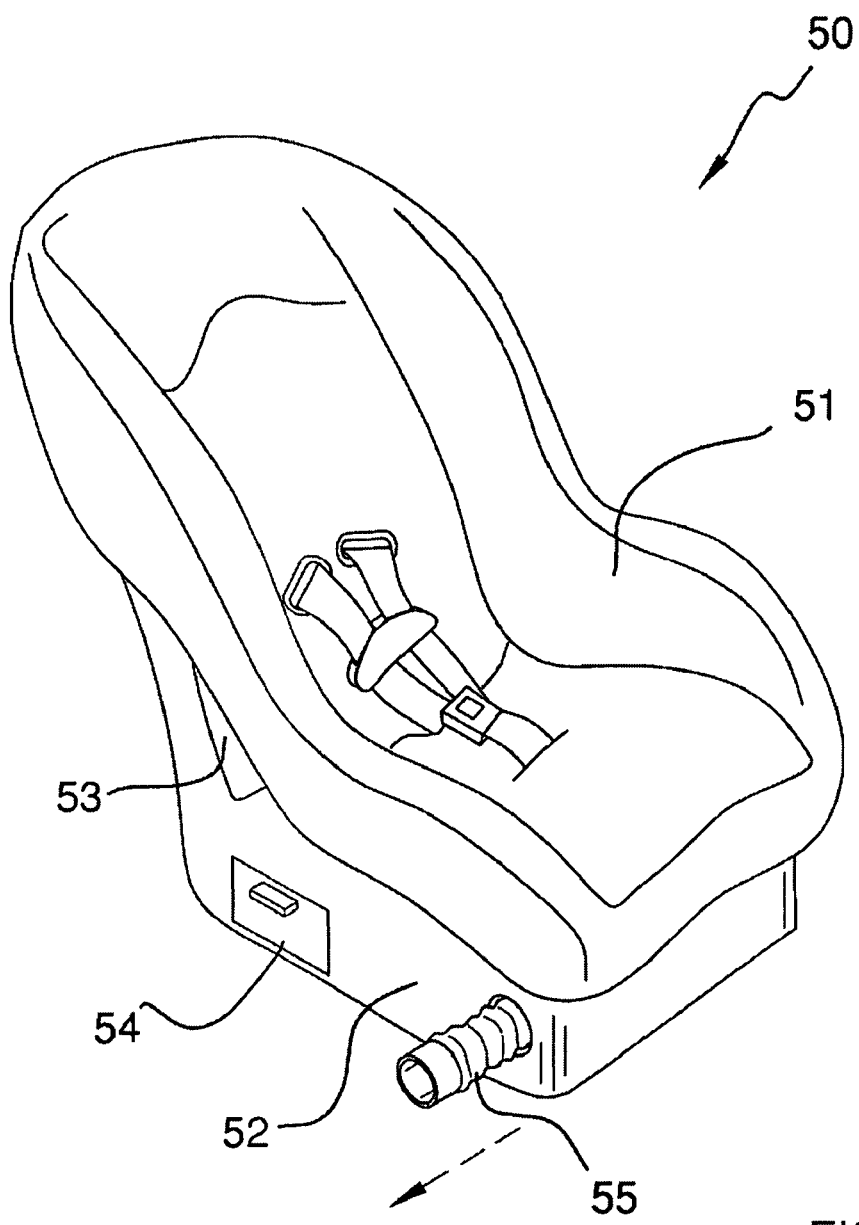
FIG. 6 illustrates an isometric view of the alternative embodiment containing both the child safety seat and the vacuuming system.
Figure 7:
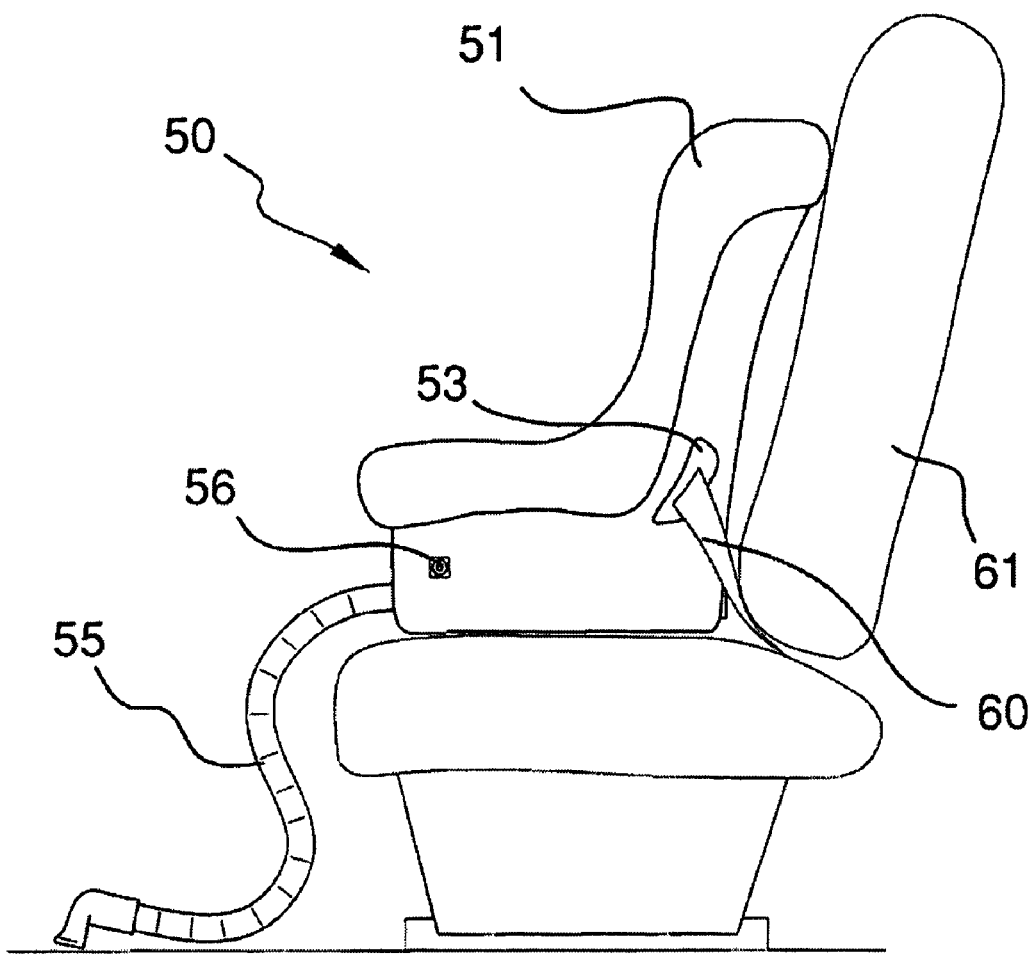
FIG. 7 illustrates a side view of the alternative embodiment in use.

Referring to FIGS. 6 and 7, an alternative embodiment 50 includes a child safety seat 51 and a portable vacuum system 52. The portable vacuum system 52 is integrated into the base of the child safety seat 51.

Referring to FIG. 6 the base of the child safety seat 51 has an opening for a seat belt 53, a dirt collecting compartment 54, and a vacuum hose 55 that extends out from the base of the child safety seat 51. The dirt collecting compartment 54 operates in the same way as the collection drawer 15 of the invention 10 described above.

The opening 53 of the child safety seat 51 is designed for the introduction of a vehicle safety belt 60 through the child safety seat 51 for the purpose of securing the alternative embodiment 50 to a seat 61 of a vehicle.

Referring to FIG. 7, it shall be noted that the vacuum hose 55 has the same characteristics as the retractable hosing assembly 14 in that it can extend and retract form the base of the child safety seat 51.

Figure 3:
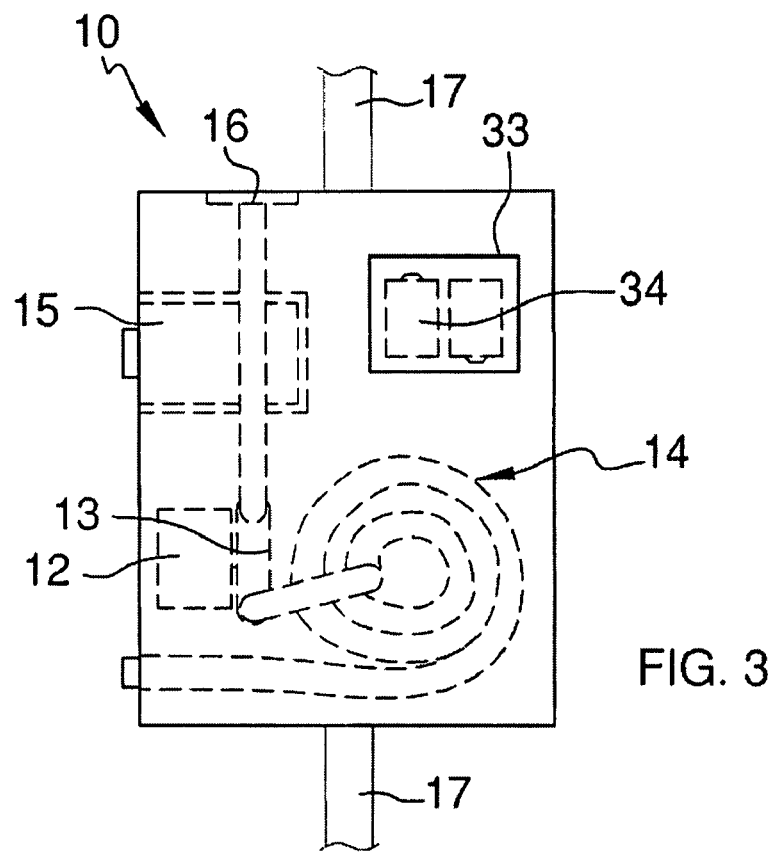
FIG. 3 illustrates a detailed top view of the invention.

The alternative embodiment 30 contains the same configuration of components of the invention 10 as depicted in FIG. 3. Referring to FIG. 7, the base of the child safety seat 51 includes an ON/OFF switch 56.

The alternative embodiment also may be electrically powered as the invention 10 is in that it may be powered via a plurality of rechargeable batteries 34 or by a DC electrical cord (not shown), which simply plugs into a standard cigarette lighter of a vehicle.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A portable vacuum system integrated with a child safety seat comprising:
   (a) a child safety seat having a base and an opening which accommodates the seat belt of a vehicle to safely secure the seat in a vehicle;
   (b) a motor;
   (c) a vacuum fan driven by the motor;
   (d) a retractable hose assembly in flow communication with the vacuum fan and capable of extending and retracting out of the base of the child safety seat via a hose opening;
   (e) a collection drawer located along a side of the base of the child safety seat for collecting debris collected during vacuuming;
   (f) an exhaust connected to an opposing side of the vacuum fan for directing debris to the collection drawer and exhaust air out of the system.

2. The portable vacuum system as described in claim 1 wherein the collection drawer is capable of extending and retracting with respect to the base of the child safety seat.

3. The portable vacuum system as described in claim 2 wherein the base of the child safety seat includes the opening for a seat belt to pass through in order to safely secure the child safety seat to a respective seat in the vehicle.

4. The portable vacuum system as described in claim 3 wherein an on/off switch is electrically wired to the motor and operates the portable vacuum system.

5. The portable vacuum system as described in claim 4 wherein a battery compartment is located within the base of the child safety seat containing a plurality of rechargeable batteries which are electrically wired to the on/off switch.

6. The portable vacuum system as described in claim 4 wherein an electrical power cord that plugs into a standard wall outlet or a cigarette lighter of a vehicle is electrically wired to the on/off switch.

* * * * *